United States Patent
Laas et al.

[11] Patent Number: 5,847,044
[45] Date of Patent: Dec. 8, 1998

[54] POLYURETHANE POWDER COATING COMPOSITIONS WHICH HAVE A LOW STOVING TEMPERATURE

[75] Inventors: Hans-Josef Laas, Köln; Hans-Ulrich Meier-Westhues, Leverkusen; Reinhard Halpaap, Odenthal; Ulrich Freudenberg, Pulheim; Hans-Peter Klee, Burscheid, all of Germany

[73] Assignee: Bayer Aktiengesellschaft, Leverkusen, Germany

[21] Appl. No.: 834,799

[22] Filed: Apr. 3, 1997

[30] Foreign Application Priority Data

Apr. 25, 1996 [DE] Germany ............... 196 16 496.6

[51] Int. Cl.$^6$ ............... C08J 3/00; C08K 3/20; C08L 75/00
[52] U.S. Cl. ............... 524/590; 428/423.1; 524/589; 528/44; 528/52; 528/53; 528/54
[58] Field of Search ............... 524/589, 590; 528/44, 52, 53, 54; 428/423.1

[56] References Cited

U.S. PATENT DOCUMENTS

| | | | |
|---|---|---|---|
| 3,923,743 | 12/1975 | Quiring et al. | 260/75 NT |
| 4,044,171 | 8/1977 | Muller et al. | 427/27 |
| 4,413,079 | 11/1983 | Disteldorf et al. | 524/169 |
| 4,463,154 | 7/1984 | Disteldorf et al. | 528/45 |
| 4,483,798 | 11/1984 | Disteldorf et al. | 260/239 A |
| 4,595,445 | 6/1986 | Hambach et al. | 528/44 |
| 4,900,800 | 2/1990 | Halpaap et al. | 528/66 |
| 5,492,955 | 2/1996 | Wamprecht et al. | 525/375 |

FOREIGN PATENT DOCUMENTS

| | | |
|---|---|---|
| 2130075 | 2/1995 | Canada . |
| 1488631 | 10/1977 | United Kingdom . |
| 91/07452 | 5/1991 | WIPO . |
| 93/04102 | 3/1993 | WIPO . |

*Primary Examiner*—Patrick Niland
*Attorney, Agent, or Firm*—Joseph C. Gil; Thomas W. Roy

[57] ABSTRACT

The present invention relates to a polyurethane powder coating composition containing A) a binder component which is solid below 40° C. and liquid above 130° C. and has an OH number of 25 to 200 and a number average molecular weight of 400 to 10,000, B) a polyaddition compound which is solid below 40° C. and liquid above 125° C., contains uretdione groups and optionally free isocyanate groups and is prepared from aliphatic and/or cycloaliphatic diisocyanates and C) one or more catalysts containing N,N,N'-trisubstituted amidine groups which have an amidine group content (calculated as $CN_2$; molecular weight=40) of 12.0 to 47.0 wt. %, provided that components A) and B) are present in amounts such that component B) has 0.6 to 1.4 isocyanate groups for each hydroxyl group present in component A) and the amount of component C) is 0.05 to 5 wt. %, based on the total weight of the coating composition.

The present invention also relates to the use of this powder coating composition for coating heat resistant substrates.

20 Claims, No Drawings

POLYURETHANE POWDER COATING COMPOSITIONS WHICH HAVE A LOW STOVING TEMPERATURE

BACKGROUND OF THE INVENTION

1. Field of the Invention

The present invention relates to polyurethane powder coating compositions which are curable at low stoving temperatures and to their use for coating heat-resistant substrates.

2. Description of the Prior Art

As environmental legislation has become ever stricter, the development of powder coatings, together with high solids lacquers and aqueous coating systems has become increasingly significant in recent years. Powder coatings release no harmful solvents during application, may be applied highly efficiently with little waste and, thus, are considered particularly environmentally friendly and economic.

Particularly high quality light and weather resistant coatings may be obtained using heat curable, polyurethane (PUR) powder coatings. The PUR powder coatings currently commercially available generally contain solid polyester polyols, which are cured with solid blocked aliphatic or, usually, cycloaliphatic polyisocyanates. However, these systems exhibit the disadvantage that the compounds used as blocking agents are released during thermal crosslinking and must be recovered. As a consequence, particular precautions must be taken during application both for equipment-related reasons and for environmental and occupational hygiene reasons to purify the exhaust air and/or to recover the blocking agent.

One approach to avoiding the emission of blocking agents is to use known PUR powder coating crosslinking agents containing uretdione groups as described, e.g., in DE-A 2,312,391, DE-A 2,420,475, EP-A 45,994, EP-A 45,996, EP-A 45,998, EP-A 639,598 and EP-A 669,353. These products crosslink by the thermal dissociation of uretdione groups into free isocyanate groups and the subsequent reaction of these groups with the hydroxy-functional binder. In practice, however, uretdione powder coating crosslinking agents have only been used on an infrequent basis. The reason for this resides in the relatively low reactivity of the internally blocked isocyanate groups, which generally require stoving temperatures of at least 160° C.

Although it is known that the uretdione cleavage reaction is noticeable at temperatures as low as 100° C., especially in the presence of reactants containing hydroxyl groups, the reaction proceeds so slowly at this temperature that complete curing of coatings would take several hours, an unrealistically long period for practical use. DE-A 2,420,475, DE-A 2,502,934 or EP-A 639,598 mention temperatures as low as 110° C., or even as low as 90° C. (DE 2,312,391), as possible stoving conditions for powder coating systems containing uretdione groups. However, the examples demonstrate that even with the powder coatings described in these publications, adequately crosslinked coatings are only obtainable at temperatures of 150° to 160° C. within practical stoving times of at most 30 minutes.

There has been no lack of attempts to accelerate the curing of uretdione-crosslinking PUR powder coatings by using suitable catalysts. Various compounds have already been proposed for this purpose, for example, the organometallic compounds known from polyurethane chemistry, such as tin(II) acetate, tin(II) octoate, tin(II) ethylcaproate, tin(II) laurate, dibutyltin diacetate, dibutyltin dilaurate, dibutyltin maleate (for example EP-A 45,994, EP-A 45,998, EP-A 601,079, WO 91/07452 or DE-A 2,420,475), iron(III) chloride, zinc chloride, zinc 2-ethylcaproate and molybdenum glycolate or tertiary amines such as triethylamine, pyridine, methylpyridine, benzyldimethylamine, N,N-endoethylenepiperazine, N-methylpiperidine, pentamethyldiethylenetriamine, N,N-dimethylaminocyclohexane and N,N'-dimethylpiperazine (for example EP-A 639 598).

In practice, organotin compounds are generally used. They allow the formulation of uretdione powder coatings containing no blocking agents, which reliably and reproducibly completely react to yield coatings having good solvent resistance and elasticity within 30 minutes at a temperature of 150° C. or, if shorter cycle times are desired, within 15 minutes at 180° C.

An object of the present invention is to provide novel PUR powder coating compositions which do not form elimination products, have increased reactivity and yield completely crosslinked coatings at distinctly lower stoving temperatures or at correspondingly shorter stoving times than previously known prior art powder coating compositions containing uretdione curing agents.

This object may be achieved with the polyurethane powder coating compositions according to the present invention which are described below in greater detail. The powder coatings according to the invention are based on the surprising observation that compounds containing N,N,N'-trisubstituted amidine structures, in particular bicyclic amidines, such as 1,5-diazabicyclo[4.3.0]non-5-ene (DBN), so strongly accelerate the dissociation of uretdione groups that PUR powder coating compositions may be formulated with them using known uretdione curing agents such that the powder coating compositions crosslink to yield high quality coatings at relatively low stoving temperatures and within a short time.

While EP-A 652,263, which describes the use of powder coating curing agents containing uretdione groups as an additive for powder coating compositions based on epoxy-functional copolymers and carboxyl derivatives as the crosslinking agent, do make a general reference to the two amidine bases DBN and 1,8-diazabicyclo[5.4.0]undec-7-ene (DBU) in a lengthy list of curing catalysts, the person skilled in the art could not gain any concrete indication from this disclosure that precisely these two compounds are highly effective catalysts for the dissociation of uretdione rings. This is because the working examples do not use these two catalysts, but instead an organometallic catalyst as is conventional in known PUR powder coating compositions containing uretdione groups. This reference does not recognize that the catalysts according to the present invention are particularly effective for uretdione dissociation. The low stoving temperatures for the powder systems described in EP-A 652,263 are not attributable to uretdione cleavage accelerated by catalysis with amidine bases, but are in fact within the usual range for epoxy/dicarboxylic acid systems.

SUMMARY OF THE INVENTION

The present invention relates to a polyurethane powder coating composition containing A) a binder component which is solid below 40° C. and liquid above 130° C. and has an OH number of 25 to 200 and a number average molecular weight of 400 to 10,000, B) a polyaddition compound which is solid below 40° C. and liquid above 125° C., contains uretdione groups and optionally free isocyanate groups and is prepared from aliphatic and/or cycloaliphatic diisocyanates and C) one or more catalysts containing N,N,N'-trisubstituted amidine groups which have an amidine group content (calculated as $CN_2$; molecular weight=40) of 12.0 to 47.0 wt. %, provided that components A) and B) are present in amounts such that component B) has 0.6 to 1.4 isocyanate groups for each hydroxyl group present in component A) and the amount of component C) is 0.05 to 5 wt. %, based on the total weight of the coating composition.

The present invention also relates to the use of this powder coating composition for coating heat resistant substrates.

DETAILED DESCRIPTION OF THE INVENTION

In accordance with the present invention the isocyanate groups of component B) are understood to mean the sum of the free isocyanate groups and the isocyanate groups present in dimeric form as uretdione groups.

Component A) is selected from the compounds containing hydroxyl groups known from powder coating technology which are solid below 40° C. and liquid above 130° C. and have an OH number of 25 to 200, preferably of 30 to 150, and a number average molecular weight (which may be calculated from the functionality and hydroxyl content) of 400 to 10,000, preferably 1000 to 5000.

Examples of these binders include polyesters, polyacrylates or polyurethanes containing hydroxyl groups, such as those described as powder coating binders in EP-A 45,998 (U.S. Pat. No. 4,463,154, herein incorporated by reference) or EP-A 254,152 (U.S. Pat. No. 4,900,800, herein incorporated by reference). Also suitable are mixtures of such resins.

Component A) is preferably based on polyesters containing hydroxyl groups which have a softening temperature—determined by differential thermal analysis (DTA)—of preferably 40° to 120° C., more preferably 45° to 110° C.

Component B) is selected from polyaddition products containing uretdione groups and optionally free isocyanate groups. These products are prepared from aliphatic and/or cycloaliphatic diisocyanates such as 1,6-hexamethylene diisocyanate (HDI), 1-isocyanato-3,3,5-trimethyl-5-isocyanatomethylcyclohexane (isophorone diisocyanate or IPDI), 4,4'-diisocyanatodicyclohexylmethane, 1,3-diisocyanato-2(4)-methylcyclohexane and mixtures of these diisocyanates. HDI and IPDI are particularly preferred.

The production of such polyaddition compounds by reacting polyisocyanates containing uretdione groups with difunctional and optionally monofunctional compounds reactive towards isocyanate groups, in particular dihydric and optionally monohydric alcohols, is known in principle and is described, for example, in DE-A 2,420,475 (U.S. Pat. No. 4,044,171, herein incorporated by reference), EP-A 45,996 (U.S. Pat. No. 4,483,798, herein incorporated by reference) and EP-A 45,998 (U.S. Pat. No. 4,463,154, herein incorporated by reference). The polyaddition compounds containing uretdione groups and optionally free isocyanate groups generally have a uretdione group content (calculated as $C_2N_2O_2$, molecular weight=84) of 3 to 17 wt. %. The melting point or melting range of these compounds is preferably within the temperature range from 40° to 125° C.

Preferred polyaddition compounds containing uretdione groups for use as component B) are those which have a) a free isocyanate group content (calculated as NCO, molecular weight=42) of 0 to 2 wt. %, b) a uretdione group content (calculated as $C_2N_2O_2$, molecular weight=84) of 3 to 16 wt. %, c) a urethane group content (calculated as $CHNO_2$, molecular weight=59) of 10 to 22 wt. %, d) a carboxylic acid ester group content (calculated as $CO_2$, molecular weight=44) of 0 to 20 wt. % and e) a carbonate group content (calculated as $CO_3$, molecular weight=60) of 0 to 25 wt. %, provided that the total content of carboxylic acid ester and carbonate groups is at least 1 wt. %.

According to EP-A 639,598 (Canadian Application No. 2,130,075), these polyaddition compounds containing uretdione groups are produced by reacting I) polyisocyanates containing uretdione groups and having an average isocyanate functionality of 2.0 and II) optionally up to 70 wt. %, based on the total weight of components I) and II), of other diisocyanates with III) diols containing ester groups and/or carbonate groups and having an average molecular weight of 134 to 1200, IV) optionally up to 80 wt. %, based on the total weight of components III) and IV), of diols which do not contain ester and carbonate groups and have a molecular weight of 62 to 300 and V) optionally up to 40 wt. %, based on the total weight of components III), IV) and V), of compounds containing one isocyanate-reactive group, at an equivalent ratio of isocyanate groups to isocyanate-reactive groups of 1.2:1 to 0.6:1.

Component B) is used in the powder coating compositions according to the invention in an amount such that there are 0.6 to 1.4, preferably 0.8 to 1.2 isocyanate groups of component B) for each hydroxyl group of binder component A).

In order to accelerate curing, the powder coatings according to the invention contain catalysts C) containing N,N,N'-trisubstituted amidine groups and having an amidine group content (calculated as $CN_2$, molecular weight=40) of 12.0 to 47.0 wt. %, preferably of 15.0 to 40.0 wt. %. Suitable catalysts C) include any optionally substituted amidine bases bearing alkyl, aralkyl or aryl residues, in which CN double bond of the amidine structure may be arranged both as part of an open-chain molecule and as a constituent of a cyclic or bicyclic system or also exocyclically on a ring system. Mixtures of amidines may also be used.

Suitable amidine catalysts C), in which the CN double bond is present as part of an open-chain molecule, include N,N-dimethyl-N'-phenylformamidine or N,N,N'-trimethylformamidine, the production of which is described, for example, in Chem. Ber. 98, 1078 (1965). Examples of suitable amidines C), in which the CN double bond is a constituent of a cyclic system include 2-methyltetrahydropyrimidines substituted in position 1, which may be obtained according to DE-A 2,439,550 by reacting N-monosubstituted 1,3-propanediamines with acetoacetic acid derivatives, or monocyclic amidine bases, which may be obtained according to DE-A 1,078,568 by reacting carbamoyl chlorides obtained from secondary amines with lactams. Suitable catalysts C), in which the CN double bond is arranged exocyclically on a ring system, include imines of N-alkyl-substituted lactams, such as 2-methylimino-1-methylpyrrolidone, the production of which is described in Chem. Ber. 101, 3002 (1968).

Preferably, however, component C) is selected from bicyclic catalysts containing N,N,N'-trisubstituted amidine structures and corresponding to the formula

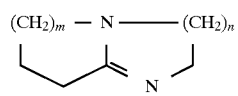

wherein
- m represents an integer from 1 to 9, preferably 1 to 3 and
- n represents an integer from 1 to 3, preferably 2.

The production of these bicyclic amidines is known and described, for example, in DE-A 1,545,855 or EP-A 662,476. 1,5-diazabicyclo[4.3.0]-non-5-ene (DBN) is a particularly preferred catalyst C) for the powder coating compositions according to the invention.

The catalysts C) are used in the powder coatings according to the invention in a quantity of 0.05 to 5 wt. %, preferably of 0.1 to 3 wt. %, based on the total weight of the coating composition.

Optional catalysts D) include other known catalysts from polyurethane chemistry, which have previously been described. These additional catalysts D) are used, if at all, in a quantity of up to 4 wt. %, preferably of up to 2.4 wt. %, based on the total weight of the coating compositions, provided that the total quantity of catalysts C) and D) is 0.05 to 5 wt. %, preferably 0.1 to 3 wt. %, and the amount of amidine catalysts C) is at least 20 wt. %, based on total weight of components C) and D).

The powder coating compositions according to the invention may optionally also contain additives E) which are known from powder coating technology. Examples include levelling agents, such as polybutyl acrylate, or those based on polysilicones; light stabilizers such as sterically hindered amines; UV absorbers such as benzotriazoles or benzophenones; pigments such as titanium dioxide; and also color stabilizers to counter yellowing due to overstoving, e.g., trialkyl and/or triaryl phosphites optionally containing inert substituents, such as triethyl phosphite, triphenyl phosphite and preferably trisnonylphenyl phosphite.

The finished powder coating composition is produced by intimately mixing components A), B), C) and optionally D) and E) and then combining them into a homogeneous material as a melt. This may proceed in suitable units, for example, heatable kneaders, but preferably by melt extrusion. The extrusion temperature is generally selected such that the mixture is exposed to maximum shear forces. However, in order to prevent premature crosslinking of the powder coating, an upper temperature limit of 110° C. should not be exceeded. The sequence in which the individual components A) to E) are combined in this process is generally not critical.

The quantity ratios of the individual components A) to E) are selected such that there are 0.6 to 1.4, preferably 0.8 to 1.2 isocyanate groups of component B) for each hydroxyl group of component A), and the proportion of component C) is 0.05 to 5 wt. %, preferably 0.1 to 3 wt. %, based on the total weight of the coating composition.

After cooling to room temperature and after appropriate initial size reduction, the extruded composition is ground to yield a powder coating composition. Grain fractions above the desired grain size, for example above 0.1 mm, are removed by screening.

The powder coating compositions produced in this manner may be applied to the substrates to be coated using conventional powder application methods, such as electrostatic powder spraying or fluidized bed coating. The coatings are cured by heating to temperatures of 110° to 220° C., preferably of 130° to 200° C., for example, for a period of approximately 5 to 30 minutes. Glossy, hard and elastic coatings characterized by excellent levelling and good solvent and chemical resistance are obtained at considerably lower stoving temperatures or shorter stoving times than with comparable uretdione powder coating compositions formulated without amidine catalysts.

Any desired heat-resistant substrates, such as glass or metals, may be coated according to the invention.

EXAMPLES

All percentages, with the exception of gloss values, are based on weight, unless otherwise indicated.

Starting Compounds

Production of polyaddition compound B) containing uretdione groups—(similar to EP-A 639,598)

a) Production of a diol containing ester groups:

901 g of 1,4-butanediol and 1712 g of ε-caprolactone were mixed together at room temperature under a nitrogen atmosphere, combined with 0.3 g of tin(II) octoate and then heated to 160° C. for 5 hours. After cooling to room temperature, a colorless, liquid product having the following properties was obtained:

| | |
|---|---|
| Viscosity (23° C.): | 180 mPa · s |
| OH number: | 416 mg KOH/g |
| Free caprolactone: | 0.2% |
| Average molecular weight (calc. from OH number): | 269 |
| Ester group content (calc.): | 25.3% | b) Production of component B) containing ester groups and uretdione groups:

1000 g (4.3 equiv) of a polyisocyanate containing uretdione groups, prepared from 1-isocyanato-3,3,5-trimethyl-5-isocyanatomethylcyclohexane (IPDI) according to the procedure described in EP-A 45995 and having a free isocyanate group content of 17.9% and a uretdione group content (determined by hot titration) of 19.1% were heated to 80° C. under dry nitrogen. A mixture of 457 g (3.4 equiv) of the diol containing ester groups from a) and 117 g (0.9 equiv) of 2-ethyl-1-hexanol was then added and the mixture was stirred at a maximum reaction temperature of 105° C. until the NCO content of the reaction mixture had fallen to a value of 0.7% after approximately 2 hours.

The melt was poured onto a metal sheet to cool and a virtually colorless solid resin having the following properties was obtained:

| | |
|---|---|
| NCO content: | 0.7% |
| Uretdione content (calc.): | 12.1% |
| Total NCO content (calc.): | 12.8% |
| Melting point: | 82 to 83° C. |

| Amidine catalysts C) | | Amidine content in wt. %* |
|---|---|---|
| C1) | 1,5-diazabicyclo[4.3.0]non-5-ene (DBN) | 32.2 |
| C2) | 1,8-diazabicyclo[5.4.0]undec-7-ene (DBU) | 26.3 |
| C3) | 1,2-dimethyltetrahydropyrimidine | 35.7 |

*calculated as $CN_2$; molecular weight = 40)

Catalysts D)

D1) tin(II) octoate
D2) dibutyltin dilaurate (DBTL)
D3) dibutyltin diacetate (DBTA)
D4) zinc chloride D5) 4-dimethylaminopyridine
D6) 1,2-dimethylimidazole
D7) benzyldimethylamine
D8) pyridine
D9) triethylamine
D10) N,N-endoethylenepiperazine (1,4-diazabicyclo[2.2.2]octane; DABCO)

Example 1 (Without Catalyst)

49.2 parts by weight of a polyester containing hydroxyl groups (which was produced from 66.6 parts by weight of terephthalic acid, 38.2 parts by weight of neopentyl glycol, 5.3 parts by weight of 1,6-hexanediol and 4.5 parts by weight of 1,1,1-trimethylolpropane and had an OH number of 50 and a melting range, determined by differential thermal analysis, of 55° to 60° C.) were thoroughly mixed with 14.3 parts by weight of polyaddition compound B), which corresponds to a total NCO:OH equivalent ratio of 1:1, 1.5 parts by weight of a commercial levelling agent (Perenol F 30 P, Henkel, Düsseldorf) and 35.0 parts by weight of a white pigment (Bayertitan R-KB 4, Bayer AG, Leverkusen) and then homogenized with a Buss model PLK 46 co-kneader at 150 rpm and a barrel temperature of 40° C. in the feed section and on the shaft and 80° C. in the processing section, wherein melt temperatures of 95° to 100° C. were reached. The solidified melt was ground and screened using an ACM 2 classifying mill (Hosokawa Micropul) with a 90 μm screen.

The gelation time of this powder coating was 380 sec at 180° C. (measured to DIN 55 990, part 8, section 5.1).

Examples 2–14

White pigmented powder coatings were produced using the process, raw materials and quantity ratios set forth in Example 1 with the exception that 1 part by weight of an amidine catalyst C) or a catalyst D) was added to the formulation. The catalyst used in each example is set forth in Table 1.

Gelation times at 180° C. (measured according to DIN 55 990, part 8, section 5.1) were determined as a measure of the reactivity of the powder coating compositions. The values found were contrasted in Table 1 with the gelation time of the uncatalyzed powder coating from Example 1.

TABLE 1

Gelation times of the catalyzed white powder coating compositions from Examples 1 to 14

| Example | Catalyst | Gelation at 180° C. [sec] |
|---|---|---|
| 1 (comparison) | — | 380 |
| 2 (according to the invention) | C1) | 23 |
| 3 (according to the invention) | C2) | 41 |
| 4 (according to the invention) | C3) | 18 |
| 5 (comparison) | D1) | 260 |
| 6 (comparison) | D2) | 290 |
| 7 (comparison) | D3) | 202 |
| 8 (comparison) | D4) | 358 |
| 9 (comparison) | D5) | 206 |
| 10 (comparison) | D6) | 401 |
| 11 (comparison) | D7) | 387 |
| 12 (comparison) | D8) | 379 |
| 13 (comparison) | D9) | 350 |
| 14 (comparison) | D10) | 397 |

Comparison of the gelation times demonstrates that the powder coating compositions according to the invention containing amidine catalysts C) were very much more reactive than comparable coating compositions which were produced using known catalysts from polyurethane chemistry.

Examples 15 and 16 (Use)

The powder coating compositions obtained according to Examples 2 and 5 were sprayed onto degreased sheet steel using an ESB cup gun at a high voltage of 70 kV and in each case cured for 15 minutes at a temperature of 150° C., 160° C. and 170° C. to yield smooth, level, white coatings. The following coating properties were determined at film thicknesses of approximately 60 μm:

Powder coating composition according to:

| | Example 2 | | | Example 5 (comparison) | | |
|---|---|---|---|---|---|---|
| | 150° C. | 160° C. | 170° C. | 150° C. | 160° C. | 170° C. |
| ET[a)] | 9.0 | >9.0 | >9.0 | 0.6 | 3.4 | 8.0 |
| Gloss[b)] | | | | | | |
| 20° | 80 | 83 | 80 | 79 | 77 | 73 |
| 60° | 92 | 95 | 93 | 91 | 91 | 90 |
| Ac[c)] | | | | | | |
| DR | 50 | 50 | 50 | 8 | 12 | 50 |
| Rating | 2 | 2 | 1–2 | 3 | 3 | 2 m |

[a)]ET = Erichsen indentation according to DIN 53 156
[b)]gloss = Gardener gloss; angle of reflection 20° and 60°
[c)]Ac = acetone test; DR = number of back and forth strokes with a saturated cotton wool swab
Rating =
0 = film intact
1 = film surface softened
2 = film swollen down to substrate
3 = film partially dissolved
m = matt (loss of gloss)

This example demonstrates that even at distinctly lower stoving temperatures, a completely crosslinked, elastic coating was obtained with the powder coating composition according to the invention.

Example 17 (According to the Invention; Additional Use of a Catalyst D))

49.2 parts by weight of the polyester containing hydroxyl groups described in Example 1 were processed with 14.3 parts by weight of polyaddition compound B) (which corresponded to a total NCO:OH equivalent ratio of 1:1), 1.0 part by weight of a commercial levelling agent (Perenol F 30 P, Henkel, Düsseldorf), 0.4 parts by weight of amidine catalyst C1), 0.6 parts by weight of catalyst D1) and 35.0 parts by weight of a white pigment (Bayertitan R-KB 4, Bayer AG, Leverkusen) in accordance with the process described in Example 1 to yield a white coating composition. The gelation time of this powder coating composition was 64 sec at 180° C. (measured according to DIN 55 990, part 8, section 5.1).

The powder was sprayed onto degreased sheet steel using an ESB cup gun at a high voltage of 70 kV and in each case cured for 15 minutes at a temperature of 150° C., 160° C. and 170° C. to yield smooth, level, white coatings. The following coating properties were determined at film thicknesses of approximately 65 μm:

|  | 150° C. | 160° C. | 170° C. |
| --- | --- | --- | --- |
| ET[a] | 9.0 | 9.0 | 9.0 |
| Gloss[b] | | | |
| 20° | 73 | 70 | 72 |
| 60° | 92 | 91 | 92 |
| Ac[c] | | | |
| DR | 50 | 50 | 50 |
| Rating | 2 | 2 | 2 |

[a] ET = Erichsen indentation according to DIN 53 156
[b] gloss = Gardener gloss; angle of reflection 20° and 60°
[c] Ac = acetone test; DR = number of back and forth strokes with a saturated cotton wool swab
Rating =
0 = film intact
1 = film surface softened
2 = film swollen down to substrate
m = matt (loss of gloss)

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane powder coating composition comprising
    A) a binder component which is solid below 40° C. and liquid above 130° C. and has an OH number of 25 to 200 and a number average molecular weight of 400 to 10,000,
    B) a polyaddition compound which is solid below 40° C. and liquid above 125° C., contains uretdione groups and optionally free isocyanate groups and is prepared from aliphatic and/or cycloaliphatic diisocyanates and
    C) one or more catalysts containing N,N,N'-trisubstituted amidine groups which have an amidine group content (calculated as $CN_2$; molecular weight=40) of 12.0 to 47.0 wt. %, provided that components A) and B) are present in amounts such that component B) has 0.6 to 1.4 isocyanate groups for each hydroxyl group present in component A) and the amount of component C) is 0.05 to 5 wt. %, based on the total weight of the coating composition.

2. The coating composition of claim 1 wherein component B) consists essentially of a polyaddition compound having
    a) a free isocyanate group content (calculated as NCO; molecular weight=42) of 0 to 2 wt. %,
    b) a uretdione group content (calculated as $C_2N_2O_2$, molecular weight=84) of 3 to 16 wt. %,
    c) a urethane group content (calculated as $CHNO_2$; molecular weight=59) of 10 to 22 wt. %,
    d) a carboxylic acid ester group content (calculated as $CO_2$; molecular weight=44) of 0 to 20 wt. % and
    e) a carbonate group content (calculated as $CO_3$; molecular weight=60) of 0 to 25 wt. %,
provided that the total content of carboxylic acid ester and carbonate groups in the polyaddition compound is at least 1 wt. %.

3. The coating composition of claim 1 wherein component B) consists essentially of a polyaddition compound prepared from isophorone diisocyanate.

4. The coating composition of claim 2 wherein component B) consists essentially of a polyaddition compound prepared from isophorone diisocyanate.

5. The coating composition of claim 1 wherein component A) consists essentially of a polyester containing hydroxyl groups and having a softening temperature of 40° to 120° C., an OH number of 25 to 200 and a number average molecular weight of 1000 to 5000.

6. The coating composition of claim 4 wherein component A) consists essentially of a polyester containing hydroxyl groups and having a softening temperature of 40° to 120° C., an OH number of 25 to 200 and a number average molecular weight of 1000 to 5000.

7. The coating composition of claim 1 wherein components A) and B) are present in amounts such that component B) has 0.8 to 1.2 isocyanate groups for each hydroxyl group present in component A) and the amount of component C) is 0.1 to 3 wt. %, based on the total weight of the coating composition.

8. A polyurethane powder coating composition comprising
    A) a binder component which is solid below 40° C. and liquid above 130° C. and has an OH number of 25 to 200 and a number average molecular weight of 400 to 10,000,
    B) a polyaddition compound which is solid below 40° C. and liquid above 125° C., contains uretdione groups and optionally free isocyanate groups and is prepared from aliphatic and/or cycloaliphatic diisocyanates and
    C) one or more catalysts containing N,N,N'-trisubstituted amidine groups which have an amidine group content (calculated as $CN_2$; molecular weight=40) of 12.0 to 47.0 wt. % and correspond to the formula

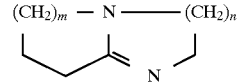

wherein
    m represents an integer from 1 to 9 and
    n represents an integer from 1 to 3,
provided that components A) and B) are present in amounts such that component B) has 0.6 to 1.4 isocyanate groups for each hydroxyl group present in component A) and the amount of component C) is 0.05 to 5 wt. %, based on the total weight of the coating composition.

9. The coating composition of claim 8 wherein component B) consists essentially of a polyaddition compound having
    a) a free isocyanate group content (calculated as NCO; molecular weight=42) of 0 to 2 wt. %,
    b) a uretdione group content (calculated as $C_2N_2O_2$, molecular weight=84) of 3 to 16 wt. %,
    c) a urethane group content (calculated as $CHNO_2$; molecular weight=59) of 10 to 22 wt. %,
    d) a carboxylic acid ester group content (calculated as $CO_2$; molecular weight=44) of 0 to 20 wt. % and
    e) a carbonate group content (calculated as $CO_3$; molecular weight=60) of 0 to 25 wt. %,
provided that the total content of carboxylic acid ester and carbonate groups in the polyaddition compound is at least 1 wt. %.

10. The coating composition of claim 8 wherein component B) consists essentially of a polyaddition compound prepared from isophorone diisocyanate.

11. The coating composition of claim 9 wherein component B) consists essentially of a polyaddition compound prepared from isophorone diisocyanate.

12. The coating composition of claim 8 wherein component A) consists essentially of a polyester containing hydroxyl groups and having a softening temperature of 40° to 120° C., an OH number of 25 to 200 and a number average molecular weight of 1000 to 5000.

13. The coating composition of claim 11 wherein component A) consists essentially of a polyester containing hydroxyl groups and having a softening temperature of 40° to 120° C., an OH number of 25 to 200 and a number average molecular weight of 1000 to 5000.

14. A polyurethane powder coating composition comprising

A) a binder component which is solid below 40° C. and liquid above 130° C. and has an OH number of 25 to 200 and a number average molecular weight of 400 to 10,000, B) a polyaddition compound which is solid below 40° C. and liquid above 125° C., contains uretdione groups and optionally free isocyanate groups and is prepared from aliphatic and/or cycloaliphatic diisocyanates and C) a catalyst component comprising 1,5-diazabicyclo [4.3.0]non-5-ene, provided that components A) and B) are present in amounts such that component B) has 0.6 to 1.4 isocyanate groups for each hydroxyl group present in component A) and the amount of component C) is 0.05 to 5 wt. %, based on the total weight of the coating composition.

15. The coating composition of claim 14 wherein component B) consists essentially of a polyaddition compound having a) a free isocyanate group content (calculated as NCO; molecular weight=42) of 0 to 2 wt. %, b) a uretdione group content (calculated as $C_2N_2O_2$, molecular weight=84) of 3 to 16 wt. %, c) a urethane group content (calculated as $CHNO_2$; molecular weight=59) of 10 to 22 wt. %, d) a carboxylic acid ester group content (calculated as $CO_2$; molecular weight=44) of 0 to 20 wt. % and e) a carbonate group content (calculated as $CO_3$; molecular weight=60) of 0 to 25 wt. %, provided that the total content of carboxylic acid ester and carbonate groups in the polyaddition compound is at least 1 wt. %.

16. The coating composition of claim 14 wherein component B) consists essentially of a polyaddition compound prepared from isophorone diisocyanate.

17. The coating composition of claim 15 wherein component B) consists essentially of a polyaddition compound prepared from isophorone diisocyanate.

18. The coating composition of claim 14 wherein component A) consists essentially of a polyester containing hydroxyl groups and having a softening temperature of 40° to 120° C., an OH number of 25 to 200 and a number average molecular weight of 1000 to 5000.

19. The coating composition of claim 17 wherein component A) consists essentially of a polyester containing hydroxyl groups and having a softening temperature of 40° to 120° C., an OH number of 25 to 200 and a number average molecular weight of 1000 to 5000.

20. A heat resistant substrate coated with the coating composition of claim 1.

* * * * *